US012166257B2

(12) United States Patent
Pucci et al.

(10) Patent No.: US 12,166,257 B2
(45) Date of Patent: Dec. 10, 2024

(54) WAVEGUIDE FILTERS

(71) Applicant: Telefonaktiebolaget LM Ericsson (publ), Stockholm (SE)

(72) Inventors: Elena Pucci, Stockholm (SE); Oscar Quevedo-Teruel, Stockholm (SE); Alberto Monje Real, Danderyd (SE); Nelson Fonseca, Noordwijk (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 342 days.

(21) Appl. No.: 17/625,848

(22) PCT Filed: Jun. 9, 2020

(86) PCT No.: PCT/SE2020/050587

§ 371 (c)(1),
(2) Date: Jan. 10, 2022

(87) PCT Pub. No.: WO2021/010877

PCT Pub. Date: Jan. 21, 2021

(65) Prior Publication Data

US 2022/0263210 A1 Aug. 18, 2022

Related U.S. Application Data

(60) Provisional application No. 62/873,198, filed on Jul. 12, 2019.

(51) Int. Cl.
*H01P 1/207* (2006.01)
*H01P 3/12* (2006.01)
*H01P 11/00* (2006.01)

(52) U.S. Cl.
CPC ................ *H01P 1/207* (2013.01); *H01P 3/12* (2013.01); *H01P 11/002* (2013.01); *H01P 11/007* (2013.01)

(58) Field of Classification Search
CPC ............... H01P 3/12; H01P 3/00; H01P 1/207
(Continued)

(56) References Cited

U.S. PATENT DOCUMENTS

| | | | |
|---|---|---|---|
| 6,118,978 | A | 9/2000 | Ihmels |
| 2018/0269557 | A1 | 9/2018 | Fangfang et al. |

FOREIGN PATENT DOCUMENTS

| | | | |
|---|---|---|---|
| IT | MI20130710 | A1 | 10/2014 |
| WO | 2009008321 | A1 | 1/2009 |
| WO | 2018108733 | A1 | 6/2018 |

OTHER PUBLICATIONS

Chen, Qiao, et al., "Dispersion Analysis of Coaxial Line Loaded with Twist-Symmetric Half-Rings, " International Workshop on Antenna Technology, Mar. 2018, IEEE, 3 pages.

(Continued)

*Primary Examiner* — Rakesh B Patel
(74) *Attorney, Agent, or Firm* — Withrow & Terranova, PLLC

(57) ABSTRACT

A filter for filtering an electromagnetic wave and a filter design method are provided. The filter comprises a cavity with a first plate and a second plate, the first and second plates are opposite to each other. The first plate comprises a number of elements distributed on the side of the first plate facing the cavity, wherein a location of each element on the first plate is defined in a coordinate system. The second plate comprises a number of elements distributed on the side of the second plate facing the cavity according to the locations of the elements on the first plate, wherein each element is distributed on the second plate with an offset with respect to a corresponding element on the first plate.

17 Claims, 14 Drawing Sheets

(58) Field of Classification Search
USPC ................................ 333/208, 209, 236, 239
See application file for complete search history.

(56) References Cited

OTHER PUBLICATIONS

Chen, Qiao, et al., "Modeling and Dispersion Analysis of Coaxial Lines With Higher Symmetries," IEEE Transactions on Microwave Theory and Techniques, vol. 66, Issue 10, Oct. 2018, 8 pages.
Ebrahimpouri, Mahsa, et al., "Cost-Effective Gap Waveguide Technology Based on Glide-Symmetric Holey EBG Structures," IEEE Transactions on Microwave Theory and Techniques, vol. 66, Issue 2, Feb. 2018, Plenum, Texas, 8 pages.
Ebrahimpouri, Mahsa, et al., "Low-Cost Metasurface Using Glide Symmetry for Integrated Waveguides," 10th European Conference on Antennas and Propagation, Apr. 10-15, 2016, IEEE, Davos, Switzerland, 2 pages.
Hesler, "A Photonic Crystal Joing (PCJ) for Metal Waveguides," MTT-S International Microwave Symposium, May 20-25, 2001, Phoenix, Arizona, IEEE, pp. 783-786.
Kildal, et al., "Design and experimental verification of ridge gap waveguide in bed of nails for parallel-plate mode suppression," IET Microwaves, Antennas & Propagation, vol. 5, Issue 3, 2011, pp. 262-270.
Quevedo-Teruel, Oscar, et al., "Ultrawideband Metasurface Lenses Based on Off-Shifted Opposite Layers," IEEE Antennas and Wireless Propagation Letters, vol. 15, 2016, pp. 484-487.
Sharp, Eugene, "A High-Power Wide-Band Waffle-Iron Filter," IEEE Transactions on Microwave Theory and Techniques, Mar. 1963, pp. 111-116.
Zaman, et al., "Narrow-Band Microwave Filter Using High-Q Groove Gap Waveguide Resonators With Manufacturing Flexibility and No Sidewalls," IEEE Transactions on Components, Packaging and Manufacturing Technology, vol. 2, Issue 11, Nov. 2012, pp. 1882-1889.
International Search Report and Written Opinion for International Patent Application No. PCT/SE2020/050587, mailed Sep. 16, 2020, 17 pages.
Dahlberg, et al., "Accurate and Low-Dispersive Control of Refractive Properties in Fully Metallic Waveguides Possessing Twist Symmetry," 12th European Conference on Antennas and Propagation, Jan. 2018, Stevenage, United Kingdom, 3 pages.
Padilla, Pablo, et al., "Broken Glide-Symmetric Holey Structures for Bandgap Selection in Gap-Waveguide Technology," IEEE Microwave and Wireless Components Letters, vol. 29, Issue 5, May 2019, pp. 327-329.

(a)

(b)

(a)

(b)

(c)

(a)

(b)

(a)

(b)

(a)

(b)

(a)

(b)

WAVEGUIDE FILTERS

This application is a 35 U.S.C. § 371 national phase filing of International Application No. PCT/SE2020/050587, filed Jun. 9, 2020, which claims the benefit of provisional patent application Ser. No. 62/873,198, filed Jul. 12, 2019, the disclosures of which are incorporated herein by reference in their entireties.

TECHNICAL FIELD

Embodiments herein relate to filters. In particular, they relate to glide symmetric waveguide filters for mm-waves and submm-waves applications and electronic devices comprising the filters in a wireless communications system.

BACKGROUND

A Universal Mobile Telecommunications System (UMTS) is a third generation (3G) telecommunication network, which evolved from the second generation (2G) Global System for Mobile Communications (GSM). Specifications for the Evolved Packet System (EPS), also called a Fourth Generation (4G) network or Long Term Evolution (LTE), have been completed within the 3rd Generation Partnership Project (3GPP) and this work continues in the coming 3GPP releases, for example to specify a Fifth Generation (5G) New Radio (NR) network.

With the arise of the 5G technology, the usage of bands for mobile telecommunications is shifting up to radio frequencies (RF) at 28 GHz millimeter wave (mm-waves) and even 60 GHz is expected to be used in the near future, in order to make the most of the available radio spectrum. With the advance of 5G applications and mm-waves, the need for compact and integrated antenna system solutions which exhibit high efficiency and low loss increases. 5G antenna systems are directly integrated with the radio unit, so there is a need for low loss RF components that can be easily connected to antennas in a cost-effective way. This need is even more underlined at high frequencies, e.g. mm-waves and submm-waves, as the dimensions scale down with the increase of the frequency.

In particular, RF filters are very important components in the antenna/radio unit. Filters need to have low losses and high Q-factors, sharp roll-off and possibly wide stop-bands to attenuate possible spurious emissions in the out-of-band region.

Waveguide filter solutions are preferred for mm-waves applications, because they can be made of only metal, have low losses, and can have high power handling capability. However, traditional waveguides may be difficult to realize at those frequencies, as dimensions are small, the manufacturing needs to be very accurate and the assembly of the constituting parts needs to be well electrically connected, to avoid unwanted leakage of energy from the structure. Thereby manufacturing becomes complex and expensive. For this reason, research and industry are looking for new waveguide-based filter solutions that can be cost effective and overcome the challenges mentioned above.

The prior art waveguide filters solutions are: waveguide filters based on stubs, iris filters, and waffle iron filters. Waveguide filters based on stubs are quite bulky and have limited rejection band. Iris filters may be more compact but present limited higher order mode rejection. Waffle iron filters provide good rejection of the higher order modes, because the attenuation in these filters is independent of the mode of propagation. Waffle iron filters are made with two metal blocks, one above the other one separated by a gap. Each block is made with 2-dimensional metallic geometries like pins and each geometry is exactly aligned to its relative one on the bottom, thus making a corrugated filter with longitudinal and transversal slots as shown in FIG. 1, wherein (a) shows the two-dimensional structure of the waffle iron filter and (b) shows its side view.

The arrangement of 2-dimensional metallic shapes, such as pins, which are periodically repeated along the structures may be also referred to as electromagnetic band gap (EBG) surface.

EBG surfaces have become an attractive solution to make integrated antennas and transmission line components. EBG surfaces are materials that are designed to control the in-plane propagation of electromagnetic waves. They are usually formed as sub-wavelength periodic structures that create a stop-band of the propagating waves in a certain frequency range and constrain propagation only along desired directions where the periodic structures are not present. In this way, unwanted radiations, leakage and surface waves may be minimized thus having structures that may be realized in a simpler and cheaper way for high frequency applications. An example of waveguide using EBG surfaces is the gap waveguide technology, such as in P. -S. Kildal, A. U. Zaman, E. Rajo-Iglesias, E. Alfonso, and A. Valero-Nogueira, "Design and experimental verification of ridge gap waveguide in bed of nails for parallel-plate mode suppression," IET Microwaves, Antennas & Propagation, vol. 5, no. 3, pp. 262-270, 2011, and A. U. Zaman, P. -S. Kildal, A. A. Kishk, "Narrow-Band Microwave Filter Using High-Q Groove Gap Waveguide Resonators with Manufacturing Flexibility and No Sidewall", IEEE Transactions on Components, Packaging and Manufacturing Technology, Vol. 2, No. 11, November 2012, which is a waveguide that may be realized in two metal blocks without need of metal contacts between the blocks by using EBG surfaces on the sides of the waveguide, i.e. periodic metallic pins, as the example shown in FIG. 2. The pins on the sides act as a wall, stopping any unwanted leakage of energy from the sides of the waveguide, thus confining the electromagnetic field only along the waveguide. In this way, the waveguide component is easier to realize because there is no need for an electrical contact and alignment between the two plates, which is critical at very high frequencies.

One main problem with gap waveguide and waffle-iron filters, is that at mm-waves the metallic pins become very small, and their manufacturing is more difficult, hence more expensive.

Another type of EBG surface which has been recently introduced is characterized by a glide symmetry, as described in Mahsa E. et.al., "Low-Cost Metasurface Using Glide Symmetry for Integrated Waveguides", 10th European Conference on Antennas and Propagation (EuCAP), 10-15 Apr. 2016, Davos, Switzerland.

A periodic structure of period d is said to be glide symmetrical when it remains invariant to a translation over half a period d/2 and a mirroring. The glide symmetry concept is based on a structure made of periodic repetition of elementary geometries such as pins, or holes, or any other shapes. The concept is illustrated in FIG. 3 for elements with triangular geometry, which are mirrored with respect to z-axis and displaced with respect to each other by half period, d/2, along one dimension, e.g. z-axis. Mathematically, this may be expressed in a Cartesian coordinate system as follows $$G_{1D} \equiv \begin{cases} x \to x \\ y \to -y \\ z \to z + d/2 \end{cases}$$

The glide-symmetric concept may also be expressed as a periodic repetition of unit cells of width d, i.e. the distance between two consecutive geometries, as showed in FIG. 3. Glide symmetry was introduced as a means to reduce computational complexity of electrically large systems as their properties could be derived from the behavior of the unit cell using the generalized Floquet's Theorem.

$G_{1D}$ states for 'Glide 1D' and expresses the placement of the geometries or shapes that are glide-symmetric along one dimension, in this case the z-axis. Structures having glide-symmetric geometries, as expressed above, are usually characterized with a first mode of propagation less dispersive which opens up for the opportunity of ultrawideband designs when compared to similar structures without glide-symmetry. Another advantage with glide symmetry structures is the easy mechanical realization for mm-waves and submm-waves when using cylindrical holes which can be easily drilled on the metal surface thus making manufacturing easy and cheap. One example of a one-dimensional glide-symmetric structure is shown in FIG. 4. In this case the unit cell is made of holes drilled on two parallel metal plates that are facing each other and that are separated by a gap g. The axes of a three dimensional orthonormal coordinate system are disclosed with respect to the top view of one of the two plates. In the side view and the three dimensional view at respectively the top and to the right in FIG. 4, it can be seen that the upper hole is mirrored with respect to the x-z-plane, and displaced d/2 with respect to the bottom hole along z-axis, thus forming a glide-symmetric unit cell of dimension d.

RF filters for mm-waves applications need to have low losses, i.e. high Q-factors. For this reason, the preferred choice is to make such filters in metal rather than in dielectric, i.e. waveguide-types of filters are wanted. However, waveguide filters for mm-waves applications are difficult to realize, as manufacturing is more complex and expensive. Also, sometimes large stop-bands are needed to suppress spurious emissions and harmonics in the out-of-band region, coming from other devices or sub-systems in a same integrated multi-band wireless communication system.

There are problems with prior art waveguide filters, e.g. waveguide filters based on stubs are bulky, iris filters have quite limited stop-band or rejection band, waffle iron filters and gap waveguide filters are difficult to realize at mm-waves because pins are too small. Also, these types of filters usually generate only one pass-band or stop-band due to their design, so no multiple pass-bands and stop-bands.

SUMMARY

Therefore it is an object of embodiments herein to provide a design technique and a filter with improved features and performance.

According to an aspect, the object is achieved by a filter for filtering an electromagnetic wave. The filter comprises a cavity with a first plate and a second plate, the first and second plates are in parallel and opposite to each other. The first plate comprises a number of elements distributed on the side of the first plate facing the cavity, a location of each element on the first plate is defined in a coordinate system. The second plate comprises a number of elements distributed on the side of the second plate facing the cavity according to the locations of the elements on the first plate, each element is distributed on the second plate with an offset with respect to a corresponding element on the first plate.

According to an aspect, the object is achieved by a method for designing a filter for filtering an electromagnetic wave. The method comprises choosing an element; choosing size of a rectangular parallelepiped cavity with a first plate and a second plate being faces of said rectangular parallelepiped, the first and second plates are in parallel and opposite to each other; choosing a number of elements distributed on the side of the first plate facing the cavity, defining locations of each element on the first plate by a coordinate system; choosing a number of elements distributed on the side of the second plate facing the cavity, defining locations of the elements on the second plate according to the locations of the elements on the first plate such that each element is distributed on the second plate with an offset with respect to a corresponding element on the first plate; analysing an unit cell comprising a subset of the chosen elements; assessing performance of the unit cell; modifying elements until improve matching; assessing performance of the filter; adjusting the size of a cavity, the number of unit cells until the performance of designed filter fulfils specifications of the filter.

Embodiments herein provide a solution for designing mm-waves filters. The filter according to embodiments herein is made of elements distributed on the first and second plates. Glide symmetry may be used to design the filters. The elements, or elementary subsets of them, referred to as unit cells, distributed on the first and second plates may be glide symmetric, and may have any shape of pins, holes, protrusions, recesses. The elements or unit cells may be designed in a way that allows different filtering capabilities.

The proposed solution may offer:

- Easy and cheap manufacturing for mm-waves applications,
- Large stop-bands/rejection bands to suppress out of band emissions/harmonics;
- Flexible/selective multiple pass-bands and stop-bands;
- Low losses, more degrees of freedom in filter design;
- Easy integration or connection with existing components in mm-waves, e.g. may be directly integrated in an antenna structure;

Compared to prior art waffle iron filters, there are some advantages:

- The proposed solution allows for flexible and selective multiple pass-bands and stopbands, whereas waffle-iron filters can only produce one pass-band and one stop-band, not multiple ones.
- The proposed solution allows for easier fabrication i.e., low cost at mm-waves as there is a potential freedom in the choice of the elementary geometry used e.g. holes may be easily drilled on metal blocks. On the other hand, waffle-iron filters are made with metal pins, which become difficult and expensive to realize at mm-waves. A solution based on holey structures is also more robust.

Therefore embodiments herein provide filter design techniques and filters with improved features and performance.

BRIEF DESCRIPTION OF THE DRAWINGS

Examples of embodiments herein are described in more detail with reference to attached drawings in which.

DETAILED DESCRIPTION

Figure 1:
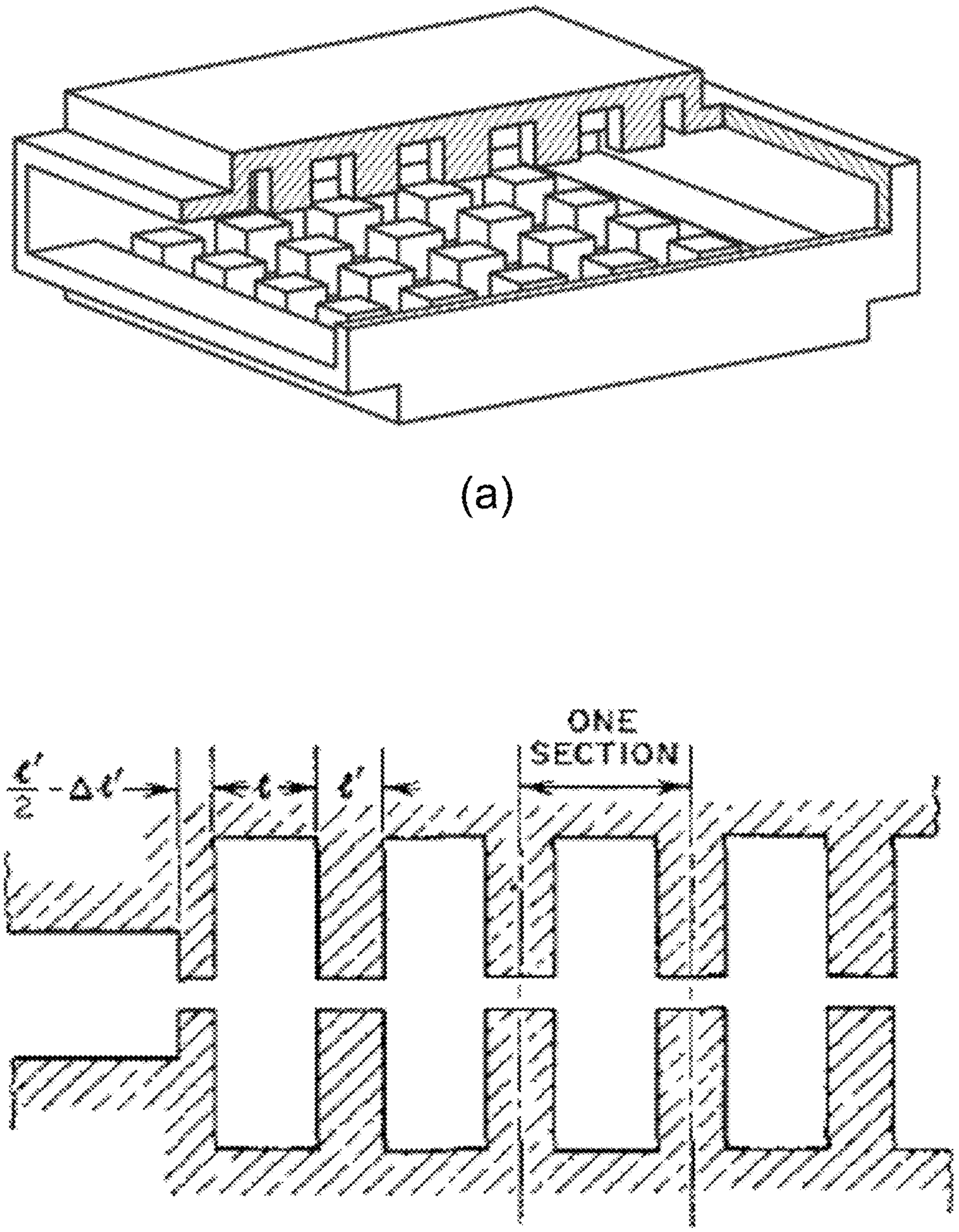
FIG. 1 illustrating a waffle iron filter structure.
Figure 2:
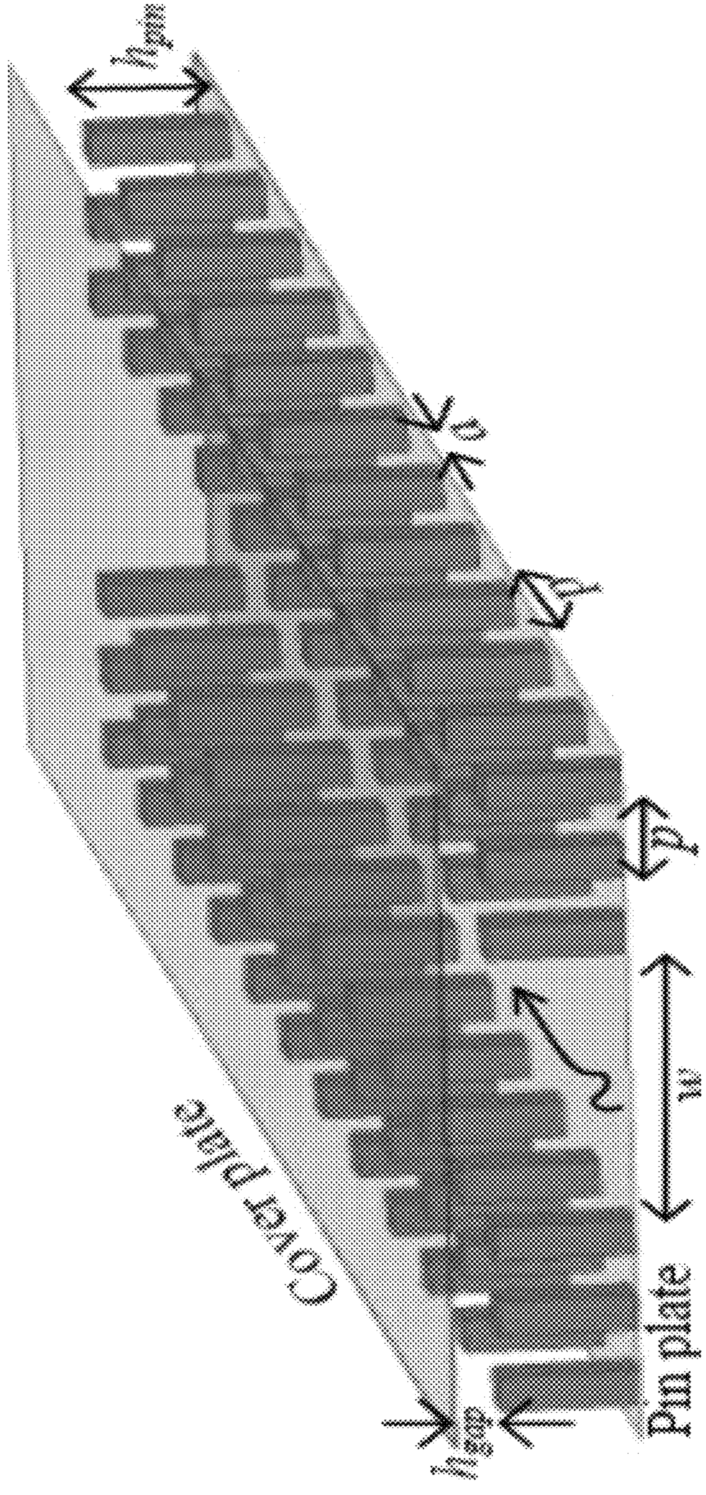
FIG. 2 illustrating a gap waveguide.
Figure 3:
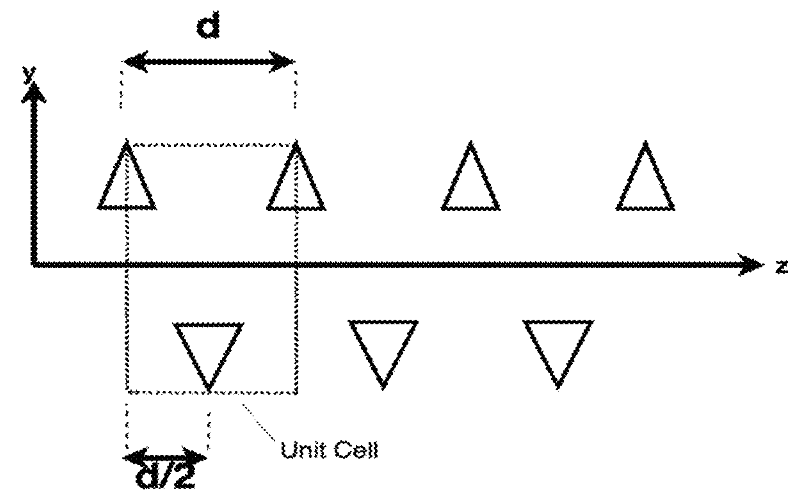
FIG. 3 illustrating glide symmetry concept and unit cell.
Figure 4:
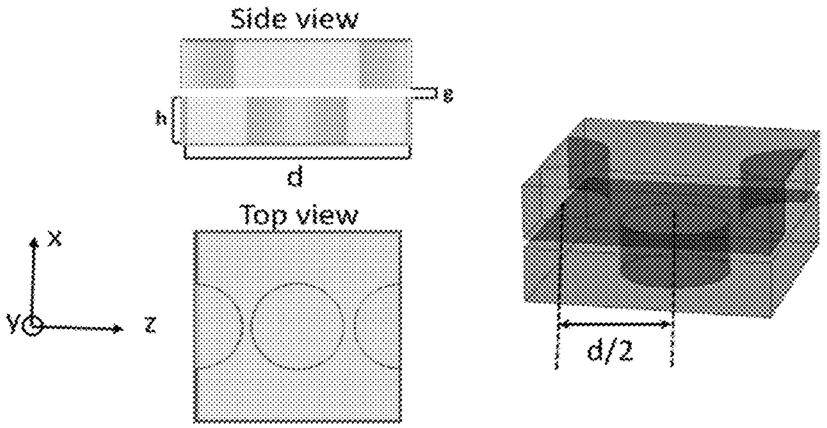
FIG. 4 illustrating glide symmetry unit cell made of holey shapes.

Lenses and gap waveguide designs made in glide symmetry have been investigated in prior arts, however, the design of filters made in glide symmetry and their capabilities have never been studied and published so far.

A glide-symmetric unit cell is therefore studied here and developed to design waveguide filters with large stop-bands and multiple selective pass-bands or stop-bands.

The term unit cell refers to the smallest periodic unit in the structure. The choice of the unit cell is of great importance, given that its shape and geometry will determine the behaviour of the structure. A unit cell may comprise a subset of elements. Both terms "unit cell" and "element" are used hereafter.

Filters may be designed by applying the glide symmetric concept along two dimensions (2D), i.e. combining a transformation along the longitudinal direction and a transformation along one of the two transversal directions with a common mirroring direction.

According to embodiments herein, a filter configured to filter an electromagnetic wave may be designed by a combination of coordinates transformations in two directions. The filter comprises a cavity with a first plate and a second plate, the first and second plates are in parallel and opposite to each other. The first plate comprises a number of elements distributed on the side of the first plate facing the cavity, wherein a location of each element on the first plate is defined in a coordinate system. The second plate comprises a number of elements distributed on the side of the second plate facing the cavity according to the locations of the elements on the first plate, wherein each element is distributed on the second plate with an offset with respect to a corresponding element on the first plate.

According to some embodiments herein, the coordinate system may be a three-dimensional orthonormal coordinate system defined by x-y-z-axes with an origin and a centre plane, i.e. an x-z plane, between and in parallel with the first and second plates, wherein the x-axis corresponds to a distance from the origin along a transversal direction of the first and second plates, the z-axis corresponds to a distance from the origin along a longitudinal direction of the first and second plates and the y-axis corresponds to a distance from an element to the centre plane and perpendicular to the first and second plates.

According to some embodiments herein, the number of elements on the first plate may be distributed according to a rectangular lattice in x and z directions, and wherein the location of each element on the second plate is defined according to a combination of coordinate transformations in the x and z directions and a mirroring transformation in y-direction such that each element is distributed on the second plate with an offset with respect to a corresponding element on the first plate in two directions.

Two implementations may be possible which are described in detail below.

The first implementation is based on two consecutive 1D transformations, which may be described mathematically as follows:

$$G_1 \equiv \begin{cases} x \to x + d_x/2 \\ y \to -y \\ z \to z \end{cases}$$

$$G_2 \equiv \begin{cases} x \to x \\ y \to -y \\ z \to z + d_z/2 \end{cases}$$

The layout of the resulting filter does not depend on the order of the transformations.

Figure 5:
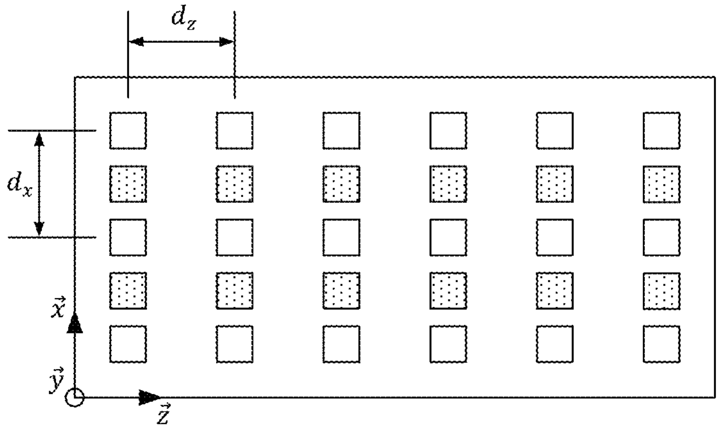
FIG. 5 illustrating an example glide symmetric filter designed based on a combination of two 1D glide symmetry transformations according to embodiment herein.
Figure 5:
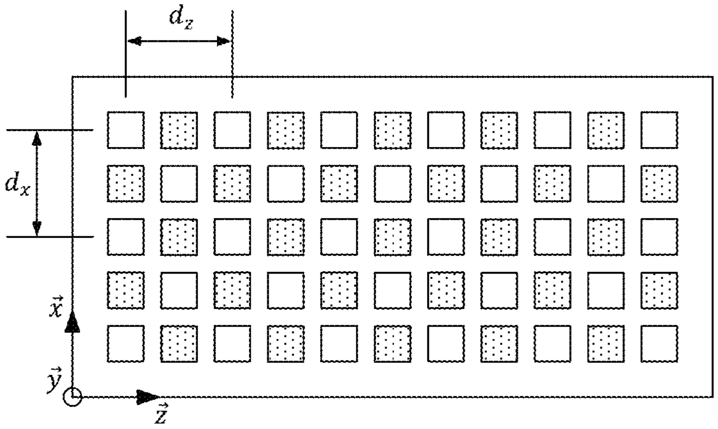
Figure 5:
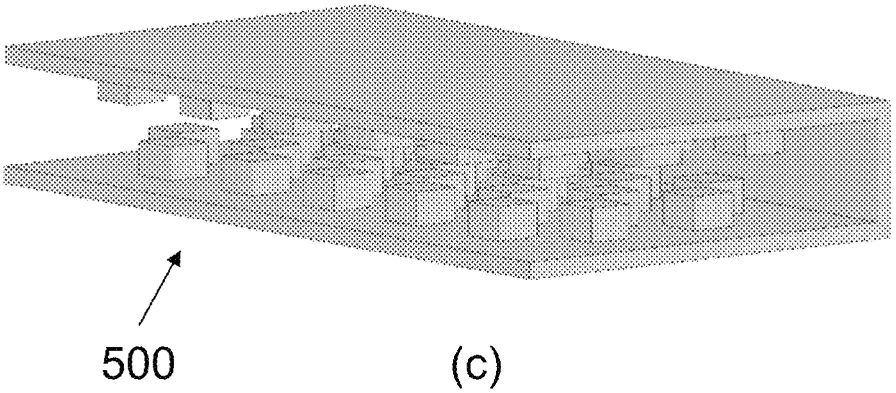

An illustration of the two steps in this transformation is provided in FIG. 5 showing a glide symmetric filter 500 with a combination of two 1D glide symmetries, where (a) is an intermediate filter layout schematic upon first transformation, (b) is a final filter layout schematic upon second transformation, and (c) is a CAD view of the final filter. The filter is a rectangular waveguide filter comprising a rectangular parallelepiped cavity with two walls or plates, a first wall and a second wall, i.e. one bottom broad wall and one top broad wall which are in parallel with the x-z plane, and two side walls or narrow walls which are perpendicular to the x-z plane. The terms "walls" and "plates" represent four of the sides that enclose the cavity and may be used interchangeably hereafter. The remaining two sides of the rectangular parallelepiped cavity are the input and output ports of the waveguide filter which may be connected to other devices.

For illustration purposes, a two-dimensional lattice of square pins is used here with the same periodicity, dx, dz, along the two axes. The initial lattice of pins, on the top broad wall of the rectangular waveguide, is schematically represented by squares without filling. The lattice of pins obtained through the first transformation $G_1$, which is located on the bottom broad wall of the rectangular waveguide, is schematically represented by dots filled squares. The transformation $G_1$ is a glide symmetry along x-axis. The intermediate filter structure is schematically represented in FIG. 5*a*. Applying $G_2$, which is a glide symmetry along z-axis, the obtained filter structure is schematically shown in FIG. 5*b*, where a lattice of pins on the top broad wall of the rectangular waveguide is schematically represented by squares without filling, and a lattice of pins obtained through the first and second transformations which is located on the bottom broad wall of the rectangular waveguide, is schematically represented by dots filled squares. A CAD view of the filter is shown in FIG. 5*c*, where one of the narrow walls is omitted to better visualise the inside of the cavity.

The proposed filter design may be generalized introducing so-called "broken" glide symmetry, where the translation along the transformation axis, x-axis and z-axis, is no longer equal to half-a-period of the original lattice, i.e. a "glide factor" αis added. The transformation may be also further generalized introducing a scaling factor β in the mirroring transformation, y-axis, resulting in an asymmetric design, where the mirrored geometry may have a different height. The corresponding transformations introduced above, $G_1$, $G_2$ may be re-written as follows:

$$G_1 \equiv \begin{cases} x \rightarrow x + \alpha_x d_x/2 \\ y \rightarrow -\beta_x y \\ z \rightarrow z \end{cases}$$

$$G_2 \equiv \begin{cases} x \rightarrow x \\ y \rightarrow -\beta_z y \\ z \rightarrow z + \alpha_z d_z/2 \end{cases}$$

where all α parameters, $\alpha_x$, $\alpha_z$, referred to as "glide factors", are within interval [0; 1], corresponding to the 'broken' glide symmetry, i.e. corresponding to the offsets in x and z directions respectively, parameters $d_x$, $d_z$, are periodicity of each element in x and z directions respectively, while parameters $\beta_x$, $\beta_z$ are positive real numbers, corresponding to a scaling factor in the mirroring transformation.

Figure 6:
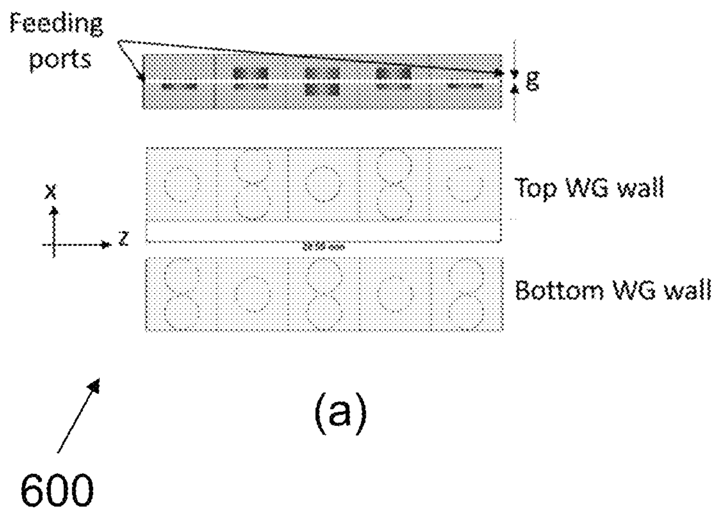
FIG. 6 illustrating another example of a glide symmetric filter designed based on a combination of two 1D glide symmetry transformations according to embodiment herein.
Figure 6:
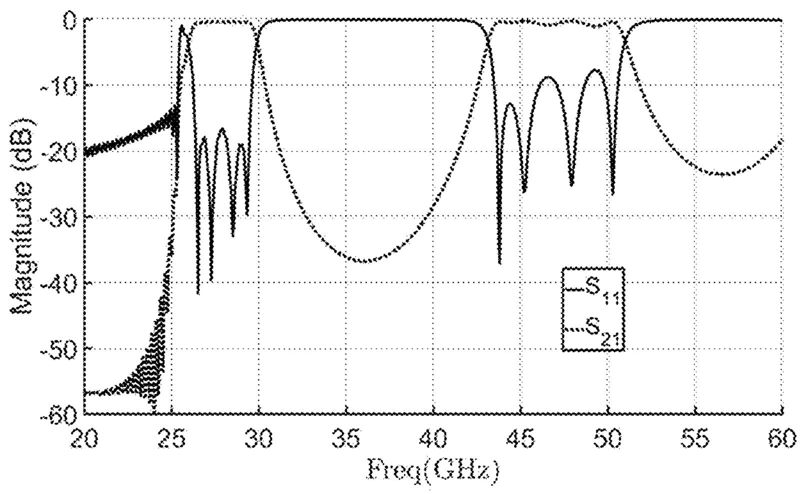

An example of glide-symmetric waveguide filter 600 based on this first implementation, i.e. the combination of two 1D glide symmetry transformations is shown in FIG. 6*a*, where top and bottom walls of the waveguide are shown. The elementary geometries in this case are cylindrical holes because they allow cheap and easy manufacturing for high frequency filter. The corresponding S-parameters are shown in FIG. 6*b*. As it can be seen from FIG. 6*b* the proposed design allows for multiple pass-bands, e.g. 25-30 GHz, 44-51 GHz and stop-bands, e.g. 30-44 GHz, and attenuation of the second harmonic at 56 GHz, for the case of 28GHz wanted signal. The specific design has been developed for 5G antenna system applications.

Figure 7:
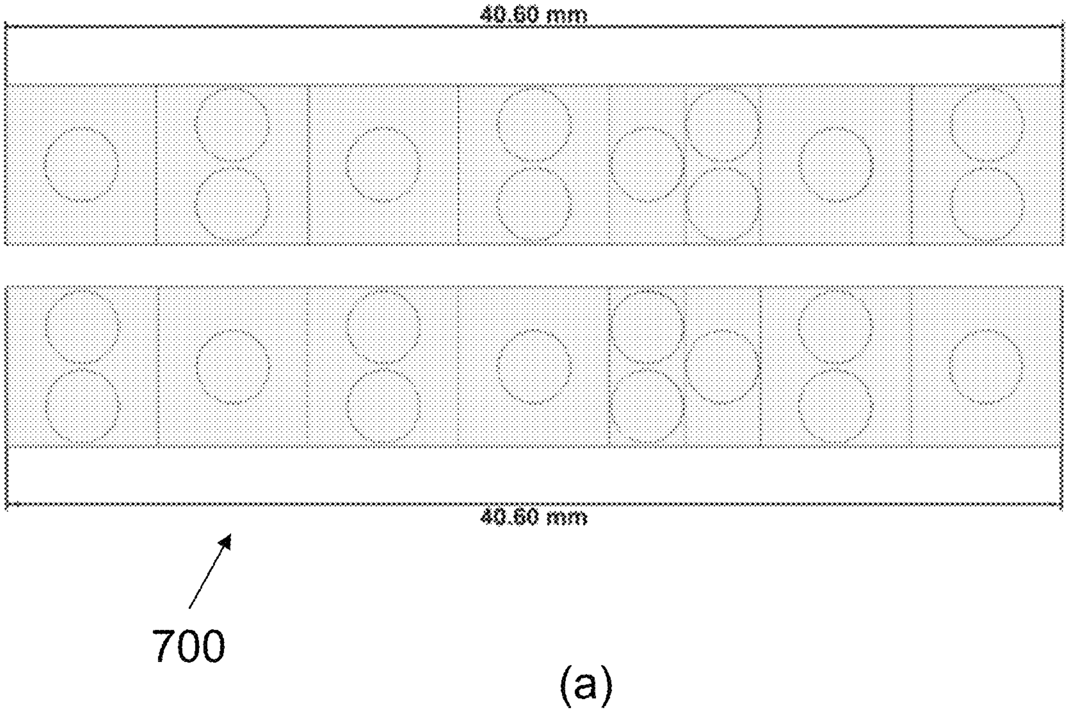
FIG. 7 illustrating another example of a glide symmetric filter designed based on a combination of two 1D glide symmetry transformations according to embodiment herein.
Figure 7:
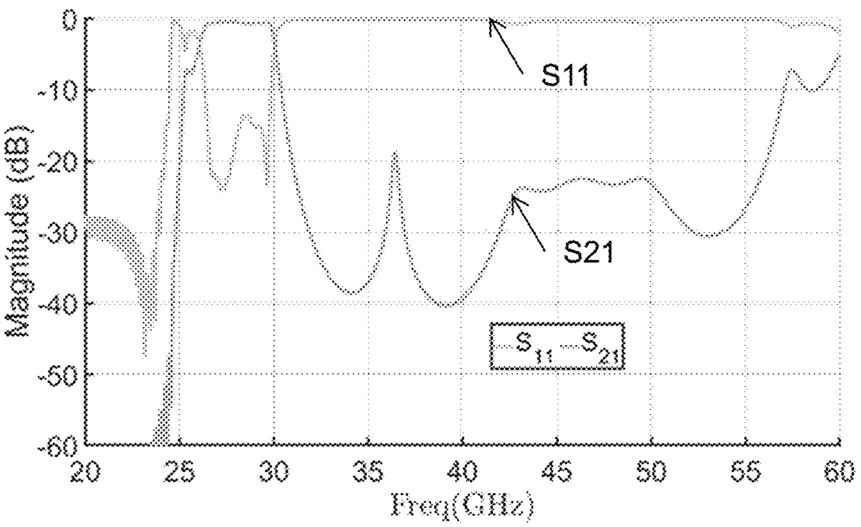

Another filter example 700 is shown in FIG. 7. By modifying some of the design parameters, among which the periodicity in one of the unit cells of the filter, elimination of out-of-bands emission and harmonic is possible, as seen in FIG. 7*b*, where a large stopband ranging from 30 GHz to 56 GHz can be seen. The attenuation of the filter may be further increased if more unit cells are added to the filter. This is to show that additional degrees of freedom are available with the filter design, allowing for multiple pass-band filters and/or wide stop-bands. Also, the diameter of the holes may be different between bottom and top holes to improve performance and facilitate further manufacturing.

According to some embodiments herein, a second proposed implementation or design of a 2D glide-symmetric filter which is based on a single 2D transformation, may be described mathematically as follows:

$$G \equiv \begin{cases} x \rightarrow x + d_x/2 \\ y \rightarrow -y \\ z \rightarrow z + d_z/2 \end{cases}$$

Figure 8:
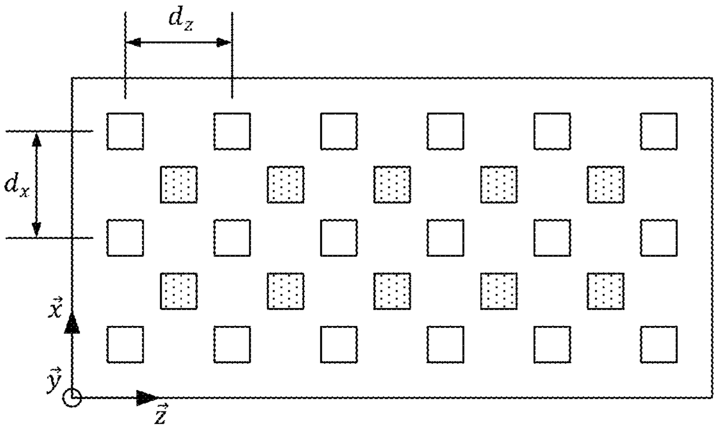
FIG. 8 illustrating an example of a glide symmetric filter designed based on a single 2D glide symmetry transformation according to embodiment herein.
Figure 8:
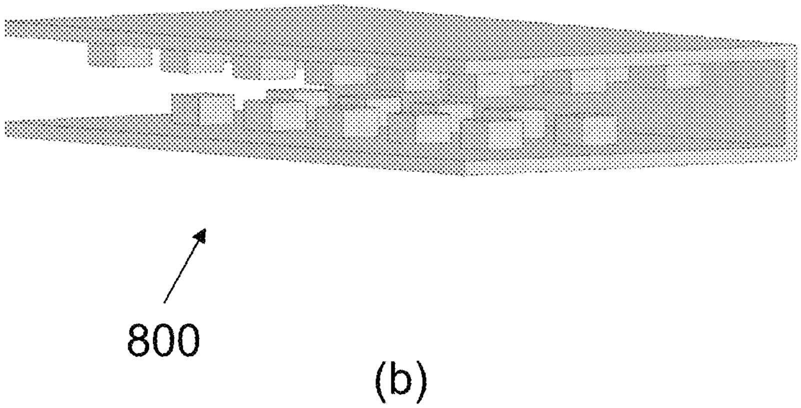

A schematic representation, following the same nomenclature as in the previous case, squares without filling at the top plate, dots filled squares at the bottom plate, is shown in FIG. 8*a*, while a CAD view of the resulting filter 800 is provided in FIG. 8*b*.

This implementation may also be generalized, when the translation along the axis is no longer equal to half-a-period, by adding a "glide factor" α. The same may be generalized for the mirroring transformation, by adding a scaling factor β. The correspondent transformation may be then re-written as:

$$G \equiv \begin{cases} x \rightarrow x + \alpha_x d_x/2 \\ y \rightarrow -\beta y \\ z \rightarrow z + \alpha_z d_z/2 \end{cases}$$

where all parameters α, referred to as "glide factors", are within interval [0; 1], corresponding to the offsets in x and z directions respectively, parameters $d_x$, $d_z$, are periodicity of each element in x and z directions respectively, while parameter β is a positive real number, corresponding to the scaling factor in the mirroring transformation.

Figure 9:
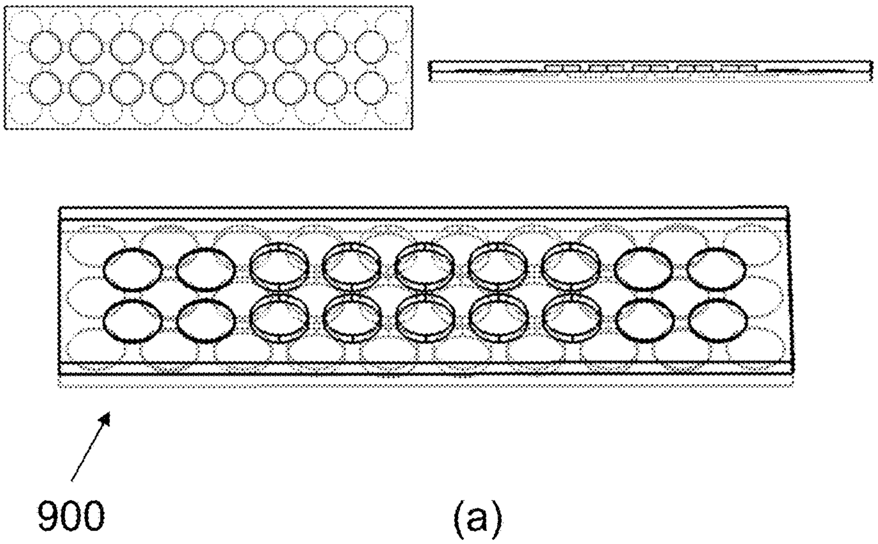
FIG. 9 illustrating another example of a glide symmetric filter designed based on a single 2D glide symmetry transformation according to embodiment herein.
Figure 9:
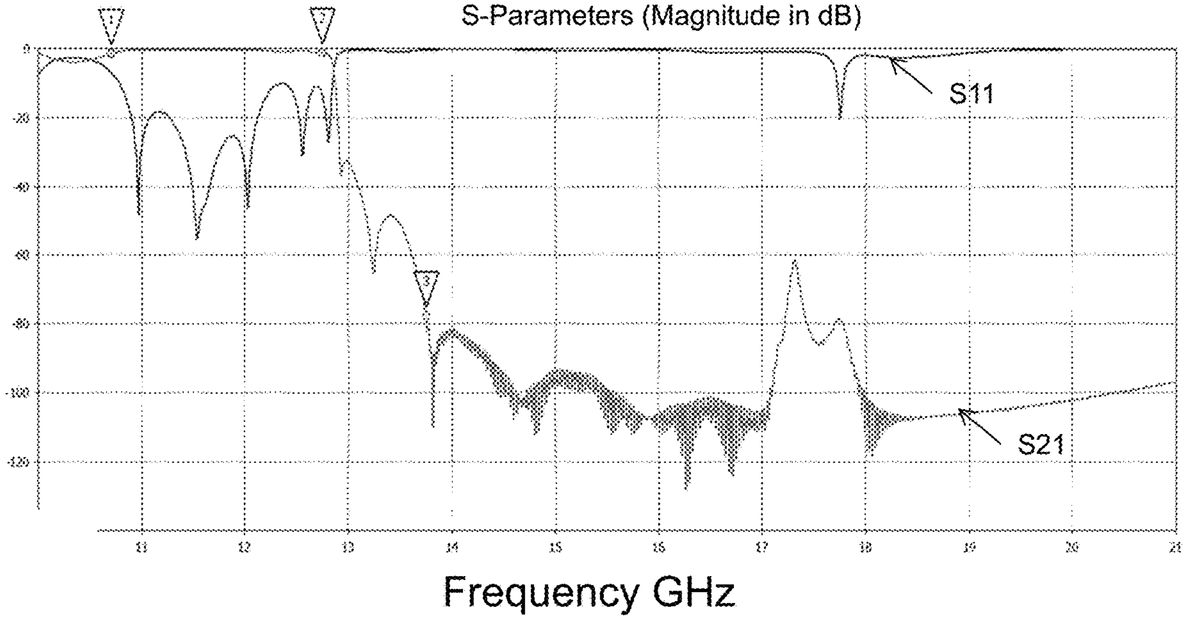

An example of a glide symmetric filter using a single 2D transformation is provided for satellite communication (satcom) applications combining Ku and Ka frequency bands. The corresponding filter design 900 is shown in FIG. 9*a*, while the corresponding S-parameters are shown in FIG. 9*b*. Although further optimization and investigations are still required, the results are promising, leading to a compact design with a large stop-band where possible emissions, like the ones appearing at 17-18 GHz may be attenuated thanks to this filter.

Figure 10:
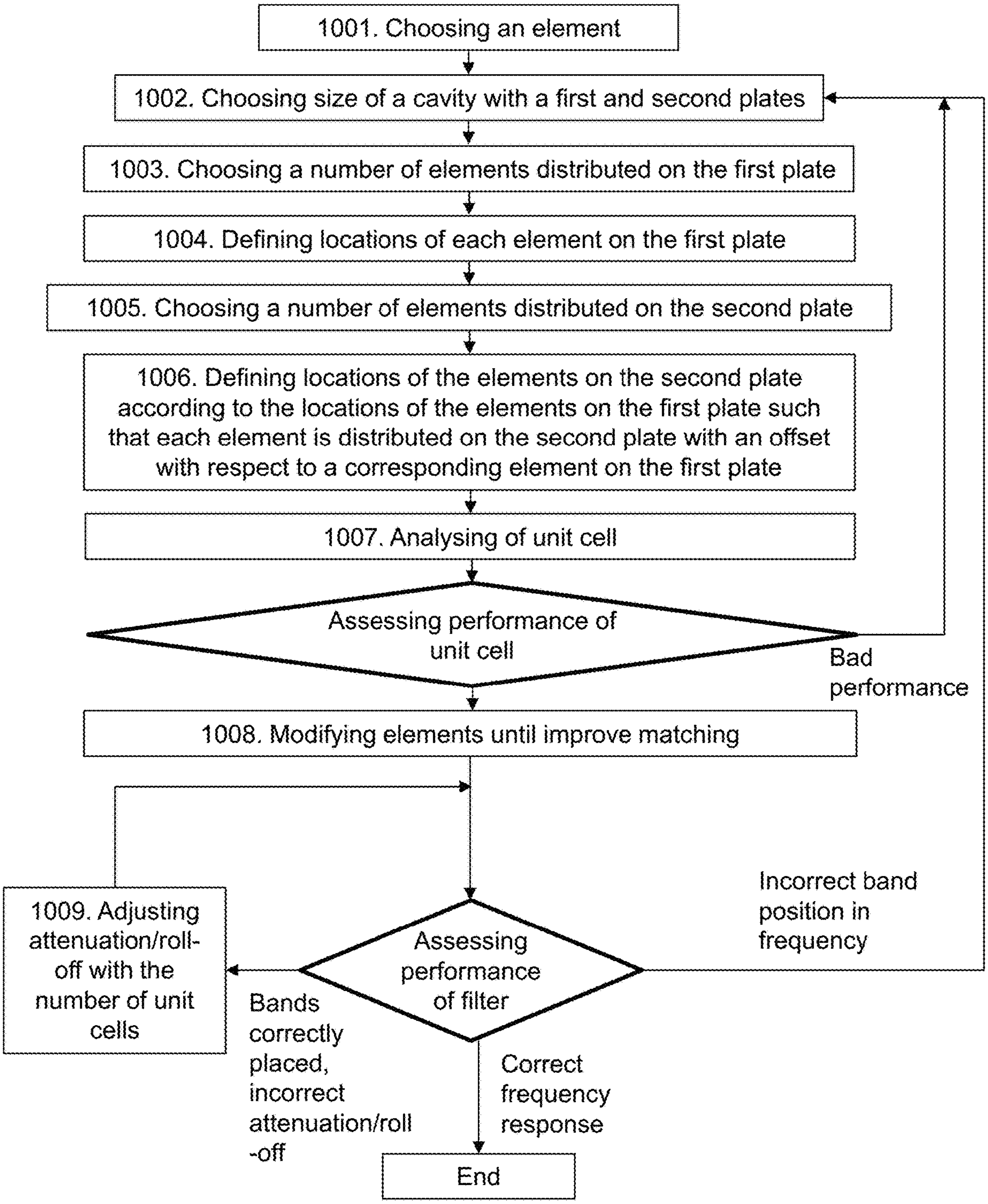
FIG. 10 is a flow chart illustrating a method for designing a filter according to embodiment herein.

Methods according to embodiments herein for designing a waveguide filter will be described in detail in the following with reference to FIG. 10. The method comprises the following steps, which steps may be performed in any suitable order.

The full design process for a filter starts from the design of a unit cell for the filter. A parametric study is conducted with the aim of helping designs and developments for various filter specifications. Then, a filter is designed using the unit cell as a building block.

Step 1001. Choosing an Element

The first step is the choice of the elements or embodiments that shall be distributed over the plates. This choice shall be motivated to fulfill design goals. For example, holes may be used to reduce manufacturing cost, while pins could be used for achieving high power handling.

Step 1002. Choosing the Size of the Cavity With a First Plate and a Second Plate The size of the cavity has to be determined according to the desired performance and size constraints imposed to the design. The width of the cavity may be used to control cutoff frequency to create bandpass filters, or it may be left wide to increase attenuation over total length of the filter. The height of the cavity may be increased to reduce insertion losses or decreased to maximize attenuation per unit length. Finally, the length of the cavity along with the other two dimensions, will constrain the maximum attenuation achievable.

Step 1003. Choosing a Number of Elements Distributed on the Side of the First Plate.

Note that once the size of the cavity and the number of elements are fixed, the periodicity and maximum size of the elements are determined. This will strongly influence the behavior of the filter.

Step 1004. Defining Locations of Each Element in the First Plate.

In this step, the lattice of elements in the first plate is defined according to the decisions made in steps 1001-1003.

Step 1005. Choosing a Number of Elements Distributed on the Side of the Second Plate Facing the Cavity.

As discussed above, the number of elements distributed on the second plate may be different from the number of the elements on the first plate.

Step 1006.

Defining locations of the elements on the second plate according to the locations of the elements on the first plate such that each element is distributed on the second plate with an offset with respect to a corresponding element on the first plate. The locations of the elements on the second plate may be defined by a combining of transformations along the longitudinal direction and along one of the two transversal directions as discussed before, i.e. applying glide-symmetric transformations e.g. 2D, two 1D or 1D transformations. When using a combination of two 1D transformations, the first step of the transformation may produce elements on the bottom plate which may be mirrored into the top plate with the second transformation. This has to be taken into account when defining the initial element lattice on the top plate.

Step 1007. Analysing of a Unit Cell.

The unit cell may comprise a subset of the chosen elements. Particularly it is the subset of those elements that represents the smallest period of the structure.

Figure 11:
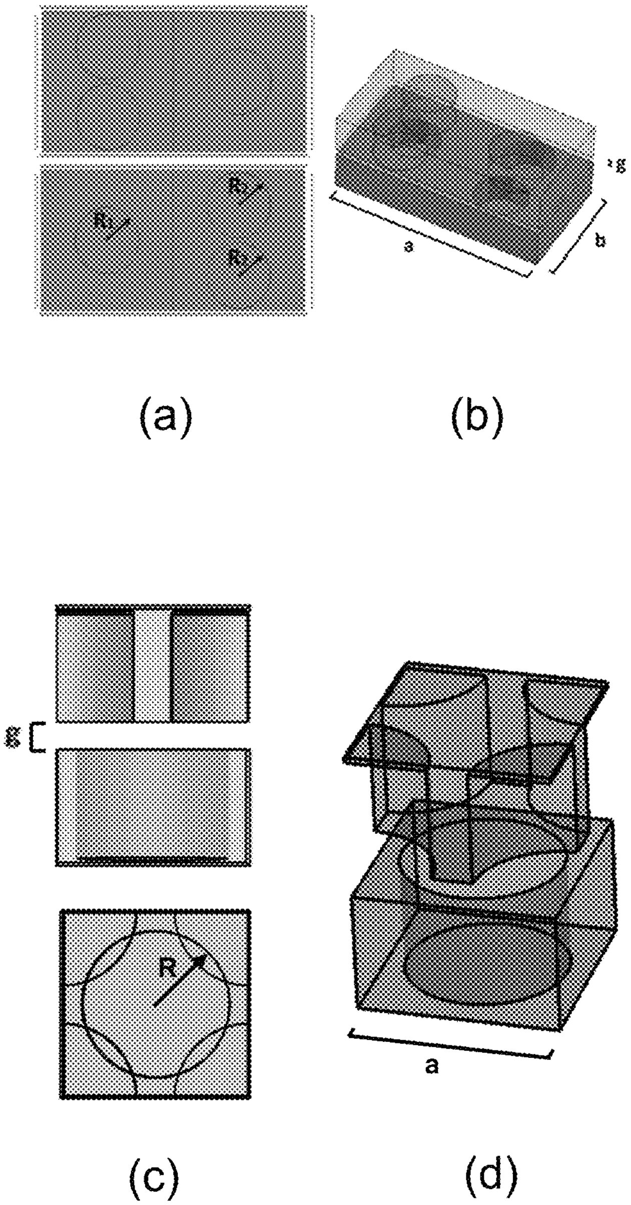
FIG. 11 illustrating a glide-symmetric unit cell obtained with two consecutive 1D transformations and made of holey shapes.

The analysis of the unit cell structure starts by analysing the behaviour of an infinite repetition of the smallest periodic unit in the structure. A unit cell obtained as a combination of two 1D glide symmetry transformations with just one central hole along the transversal direction, and with two holes on the opposite plate, is shown in FIG. 11 (*a*) and (*b*), where in (*a*) the opened unit cell with each plate set aside is shown, and in (*b*) length a representing the periodicity, length b, the waveguide width and the air gap width g, are shown. In a more general implementation, a may be the periodicity along the longitudinal direction while b may be the periodicity along the transversal direction. The radii R1 and R2 in (*a*) are the radii of the individual and double holes, respectively, which may differ for further improvement of the filtering properties. A unit cell obtained by a single 2D transformation is shown in FIG. 11 (*c*) and (*d*), where length a represents the periodicity, g is the air gap, R is the radius of the hole.

In order to understand the behaviour of the structure, it is of great use to carry out a parametric study for each unit cell that is intended to be used for the design. This parametric study helps understanding the variations of the structure with respect to each parameter, simplifying greatly the iterative design process afterwards.

Table 1 is elaborated as a summary for quick design of a holey unit cell showing the effect of parametric increments on Periodicity, Radius and Gap in the pass-band, first stop-band and second stop-band over the investigated spectrum bandwidth. Arrows pointing upwards indicate increments, while those pointing downwards indicate decrements. The equality sign is used when little or no change has been observed. NA stands for Not Applicable. Note that all variations are given considering that there is an increment in the corresponding parameter. Despite the fact that in the table only bandwidths are provided and not cut-off frequencies, the cut-off frequency is adjusted by varying the width of the waveguide in which the filter is built, since increments in the cavity width cause downshifts in frequency of the response and decrements produce the opposite effect, while keeping the bandwidths mostly unmodified.

TABLE 1

Unit cell design guidelines, for parameter increments.

| Parameter | | Passband | Stopband 1 BW | Stopband 2 BW |
|---|---|---|---|---|
| Glide factor | | = | ↓ | ↑ |
| Glide factor = 0.0 | Periodicity | ↓ | ↓ | ↑ |
| (Opposed holes) | Radius | ↓ | ↑ | ↑ |
| | Gap | = | ↓ | ↓ |
| Glide factor = 0.6 | Periodicity | ↓ | ↓ | ↓ |
| (Broken glide) | Radius | ↓ | ↑ | ↑ |
| | Gap | ↑ | ↓ | ↓ |
| Glide factor = 1.0 | Periodicity | ↓ | NA | = |
| (Glide | Radius | ↓ | NA | = |
| symmetry) | Gap | ↑ | NA | ↓ |

Once the analysis of the unit cell is carried out, the unit cell may or may not fulfil the desired behaviour. In case it does not, an iteration process is started, returning to step 1002 and modifying the parameters with a guidance e.g. Table 1 or a similar one elaborated for this purpose. In case the unit cell has the frequency behaviour desired, the filter may be built as the result of a concatenation of unit cells, and the next step is to be followed.

Step 1008. Modifying of Elements Until Improving Matching.

Parameters such as, but not limited to the height, or the radii, in holey cases, of the elements may be varied along different dimensions of the filter in order to correctly adapt the impedance of the filter to feeding unit.

After this, full wave analyses are carried out to assess the performance of the filter over frequency. Three scenarios may occur at this point. The first one is that the pass and stop bands are not placed in the correct frequency bands. In this case, further design iterations are required, going back to step 1002. The second scenario addresses the situation in which the pass and stopbands are correctly placed in frequency, but the attenuation is not correct. In this case, step 1009 (below) is applied and then the filter is analysed again. The third possible scenario is that the filter works correctly, i.e. the performance of designed filter fulfils specifications of the filter, in which case the design is completed.

Step 1009. Adjusting Attenuation/Roll-Off With the Number of Unit Cells

Given the periodic nature of the unit cells in the filter, the attenuation or roll-off may be adjusted with the number of unit cells in the filter. Of course, the maximum number of unit cells is limited by the maximum size of the cavity that was fixed in step 1002.

Figure 12:
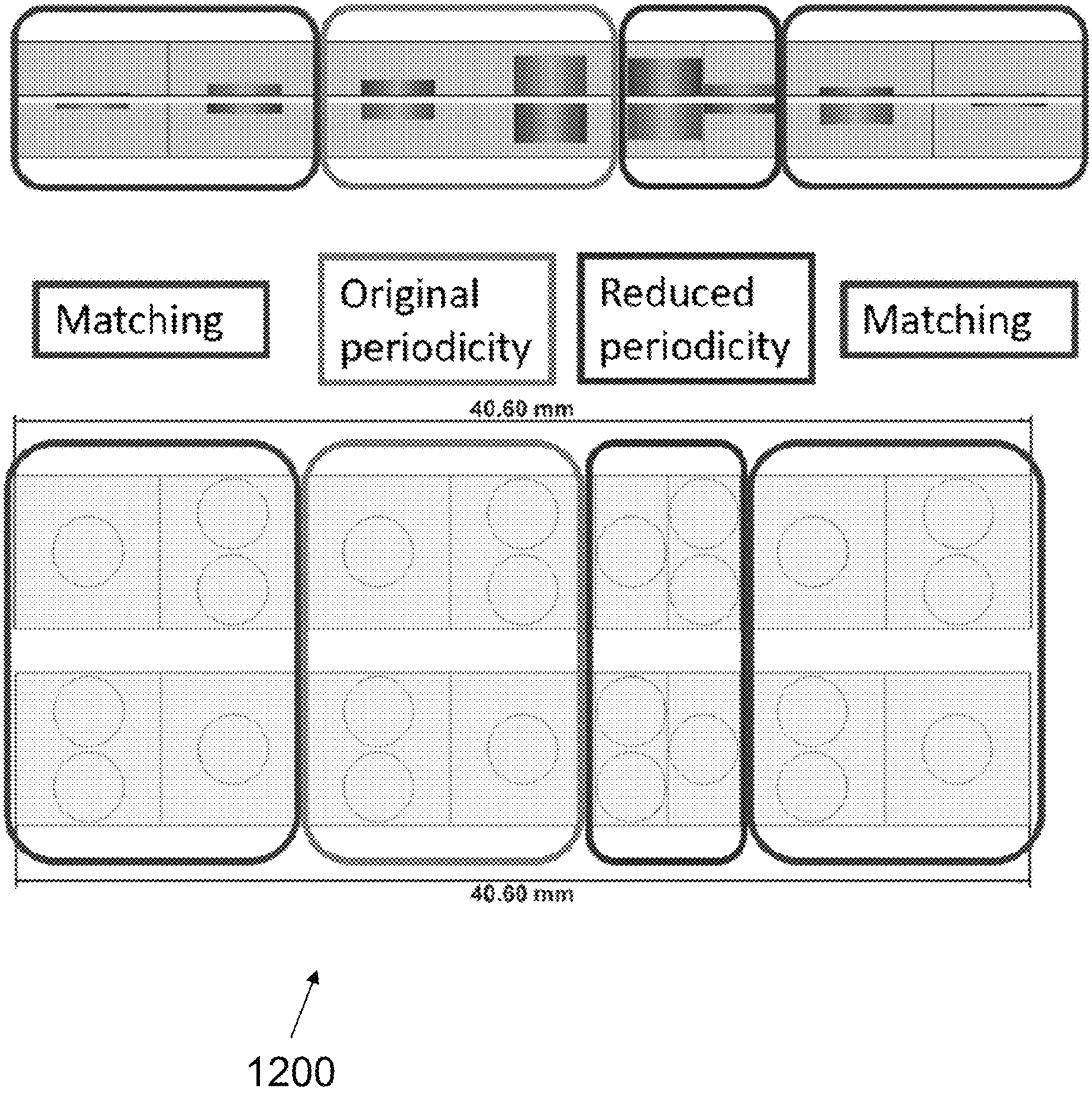
FIG. 12 illustrating an example of a glide symmetric filter with varied longitudinal periodicity designed according embodiments herein.

Beside the example filters 500, 600, 700, 800, 900 described above which are designed by the method according to embodiments herein, one more example filter 1200 designed by the method according to embodiments herein is shown in FIG. 12. As it can be seen, a unit cell of smaller periodicity has been added to the filter, at the middle of it, making use of the already matched unit cell.

Note that glide symmetry in all its variants or implementations presented here may be applied to unit cells or elements of any geometries, such as pins, and it is not limited to holes as in these examples. Also, direct integration of these filters with antennas or antenna arrays is possible.

Therefore according to some embodiments herein, each element may be a 3-D structure with any shape. The elements may be any of or a combination of pins, holes, protrusions, recesses, etc.

For mm-waves, metal waveguides are preferred for their low loss, but the concept works as well with dielectric filled waveguides in printed circuit board (PCB). So the filter may be made by any one of metal material, dielectric filled PCB material.

The number of elements, or unit cells, along the two directions of interest and corresponding periods may be adjusted independently to fit in the waveguide structure while providing the required filtering properties.

Additional degrees of freedom in the design of the filter may include:

The periodicity along the transversal and the longitudinal directions, which may be different;

The number of elements along the two directions of interest, which may be different;

The shape of the elements, which may be additive metallic e.g. pins or negative or vacuum, e.g. holes.

A change of periodicity and/or element size and shape along a given direction may also be implemented to enhance further the response of the filter, while maintaining its distinctive two-dimensional structure characteristic of the embodiments herein. So according to some embodiments herein, size and/or shape of the elements may be varied along a given direction. Periodicities of the elements along transversal and longitudinal directions may be varied.

Further generalizations may be considered, such as extending the property to cylindrical coordinates for circular waveguides with twist symmetry, or polar coordinates for structures with rotational symmetry e.g. parallel plate waveguide lenses. So according to some embodiments herein, the coordinate system may be a cylindrical coordinate system for circular waveguides or coaxial waveguides with twist symmetry.

The height of the elements, i.e. the elementary geometry e.g., holes, pins, etc. may be adjusted along the longitudinal direction of the structure to match input and output port impedances of the filter to a conventional waveguide, as commonly done in other waveguide filter solutions, such as stub filters.

The two side plates of the filter function to prevent leakage of wave energy at the sides of the filter and constrain the electromagnetic wave to propagate along a direction of the cavity from one end to the other, and as the electromagnetic wave is traversing about the elements in the cavity specific wavelengths are filtered.

According to some embodiments herein, the two sides plates may be replaced by EBG surfaces on sides of the first and second plates to prevent wave energy leakage from the sides of the filter and constrain the electromagnetic wave to propagate along a direction of the cavity from one end to the other, and as the electromagnetic wave is traversing about the elements in the cavity specific wavelengths are filtered.

Figure 13:
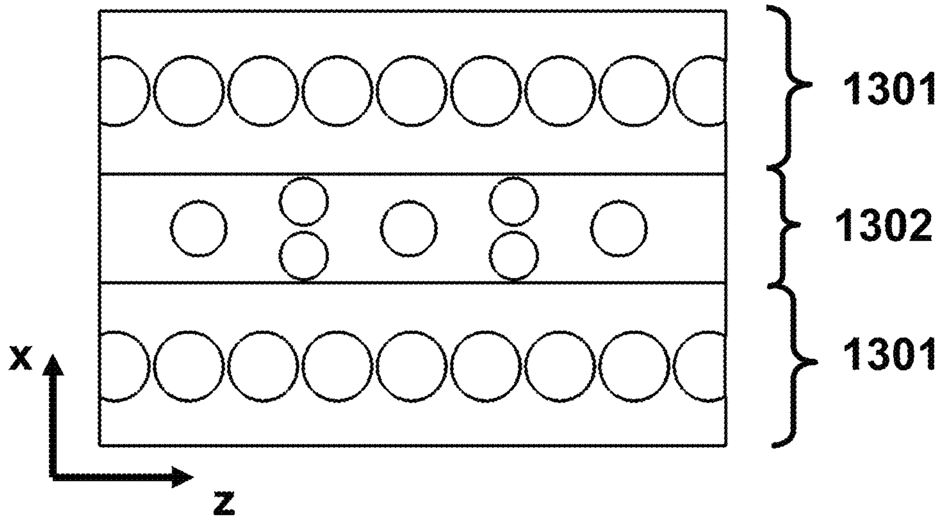
FIG. 13 illustrating another example of a glide symmetric filter with EBG side walls designed according embodiments herein.
Figure 13:
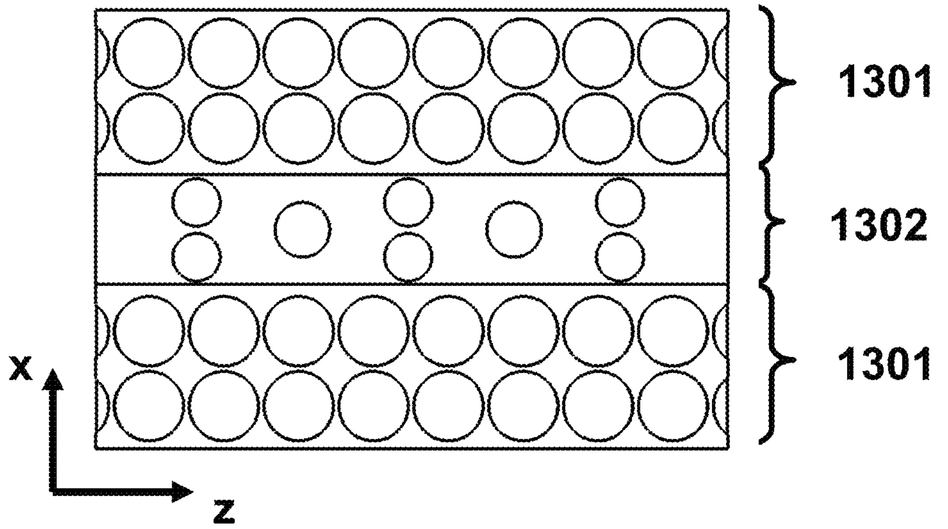
Figure 13:
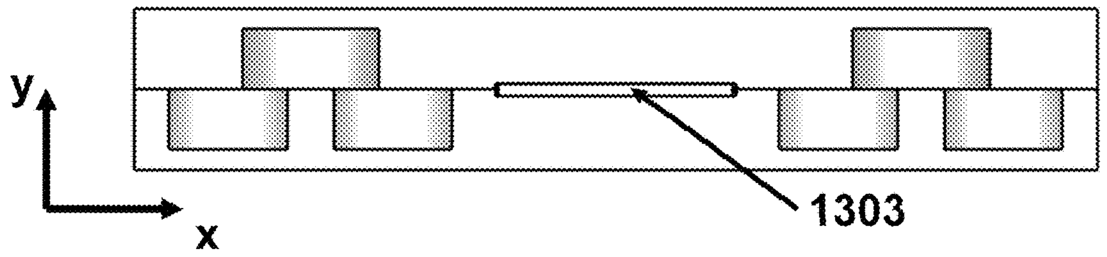
Figure 13:
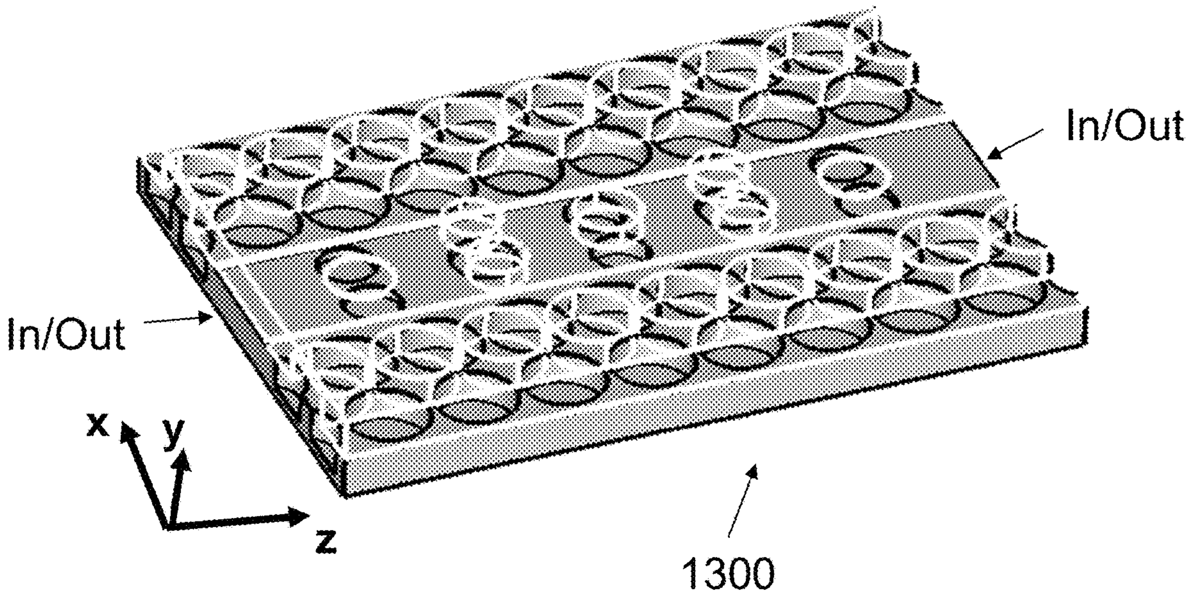

FIG. 13 shows an example filter with EBG surfaces according to embodiments herein, where (a) shows the first or top plate of the filter, (b) the second or bottom plates of the filter, (c) the front view of the filter, and (d) the perspective view of the filter, where the top plate in white outline and the bottom plate in black outline. Further, the EBG regions are indicted with reference number 1301 and the filter region is indicated with reference number 1302 on both plates in FIG. 13 (*a*) and (*b*). The propagation cavity is indicated with reference number 1303 in FIG. 13 (*c*). The wave propagates along z-axis in the filter region 1302. The input/output ports are located at the two ends or terminals of the filter region 1302 indicated with In/Out in FIG. 13 (*d*), parallel to the x-y plane.

The implementation of the embodiments herein is straight forward as it relies on well-known modelling technics as well as conventional manufacturing processes, e.g. milling. Alternative manufacturing techniques may also be considered for cost reduction e.g., Additive Manufacturing.

The embodiments herein that are based on holey surfaces, rather than pins, are easy and cheap to manufacture for millimetre wave range applications, and may therefore be preferred over embodiments with pins or other types of protrusions for applications at these wavelengths.

To summarize, the filter and design method herein is to use a 2D glide symmetry unit cell design to make waveguide filters with large stop-band and which can attenuate out-of-band emissions and harmonics. The solution also shows great degrees of freedom to have multiple pass-bands and stop-bands and is cheap to manufacture for mm-wave applications when holes are used. The 2D glide-symmetric filter design may be obtained by having elements along longitudinal and transversal directions, with two possible implementations which have been explained in detail above.

The filters according to embodiments herein provide:

Large stop-bands to attenuate out-of-band emissions and harmonics;

Easy and cheap manufacturing for mm-waves applications when holes in metal plates are considered;

Multiple selective and flexible pass-bands and stop-bands;

Low losses;

Easy integration or connection with existing components in mm-waves, e.g. may be directly integrated in an antenna structure.

Figure 14:
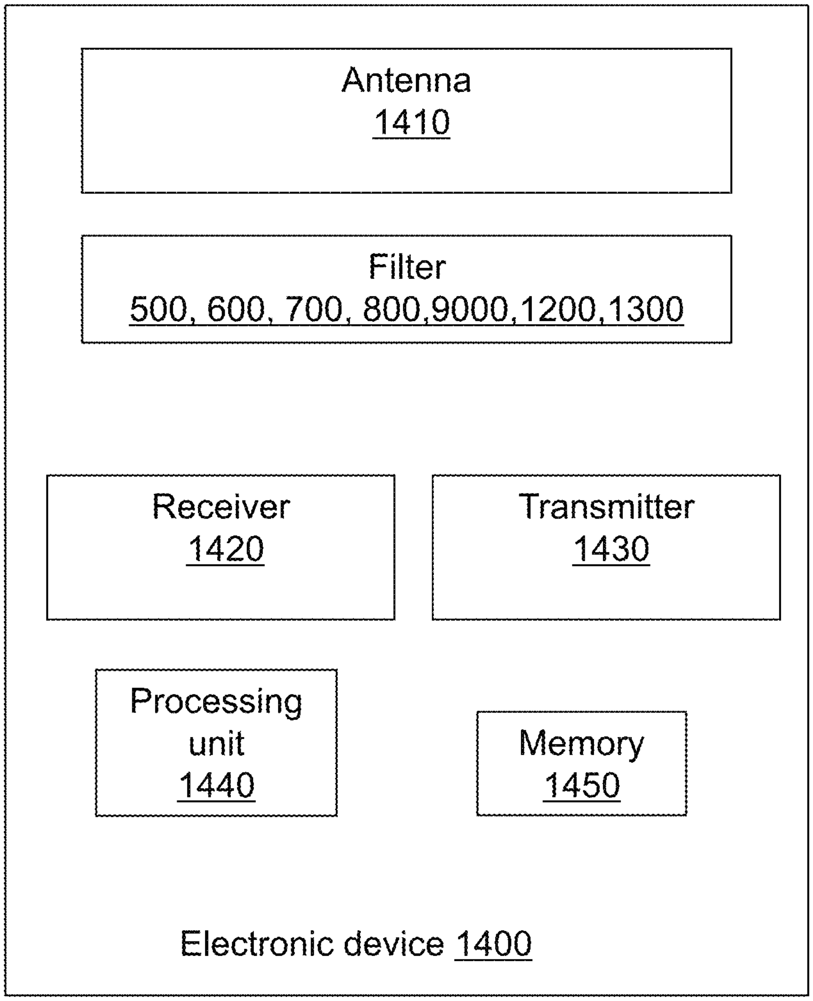
FIG. 14 is a schematic block diagram illustrating one embodiment of an electronic device using a filter according to embodiment herein.

The filters according to embodiments herein may be employed in various electronic circuits or devices, communication devices or apparatus. FIG. 14 shows a block diagram for an electronic device 1400. The electronic device 1400 comprises an antenna 1410, a receiver 1420, a transmitter 1430, a filter 500, 600, 700, 800, 900, 1200,1300. The electronic device 1400 may comprise other units, where a memory 1420, a processing unit 1430 are shown. The electronic device 1400 may be any one of a base station, a mobile device, a user equipment, a satellite equipment, a radar equipment in a wireless communications system, including terrestrial communication systems, military communication systems and satellite communication systems.

The invention claimed is:

1. A filter designed to filter an electromagnetic wave comprising:

a cavity with a first plate and a second plate, the first and second plates are opposite to each other, wherein the first plate comprises a number of elements distributed on the side of the first plate facing the cavity, wherein a location of each element on the first plate is defined in a coordinate system; and the second plate comprises a number of elements distributed on the side of the second plate facing the cavity according to the locations of the elements on the first plate, wherein each element is distributed on the second plate with an offset with respect to a corresponding element on the first plate, wherein the elements are any of holes or recesses, and wherein the filter comprises electromagnetic band gap, EBG, surfaces on sides of the first and second plates to constrain the electromagnetic wave to propagate along a direction of the cavity from one end to the other, and as the electromagnetic wave is traversing about the elements in the cavity, specific wavelengths are filtered.

2. The filter according to claim 1 is a waveguide filter, wherein the cavity is a rectangular parallelepiped.

3. The filter according to claim 1 further comprising two side plates to prevent leakage of wave energy at the sides of the filter and constrain the electromagnetic wave to propagate along a direction of the cavity from one end to the other, and as the electromagnetic wave is traversing about the elements in the cavity, specific wavelengths are filtered.

4. The filter according to claim 1, wherein the filter is made by any one of metal material, dielectric filled printed circuit board material.

5. The filter according to claim 1, wherein the coordinate system is a three-dimensional orthonormal coordinate system defined by x-y-z-axes with an origin and a center plane between and in parallel with the first and second plates, wherein the x-axis corresponds to a distance from the origin along a transversal direction of the first and second plates, the z-axis corresponds to a distance from the origin along a longitudinal direction of the first and second plates and the y-axis corresponds to a distance from an element to the center plane perpendicular to the first and second plates.

6. The filter according to claim 5, wherein the number of the elements on the first plate are distributed according to a rectangular lattice in x and z directions, and wherein the location of each element on the second plate is defined according to a combination of coordinate transformations in the x and z directions and a mirroring transformation in y direction such that each element is distributed on the second plate with an offset with respect to a corresponding element on the first plate in two directions.

7. The filter according to claim 6, wherein the location of each element on the second plate is defined according to coordinate transformations defined by $$G_1 \equiv \begin{cases} x \to x + \alpha_x d_x / 2 \\ y \to -\beta_x y \\ z \to z \end{cases}$$

$$G_2 \equiv \begin{cases} x \to x \\ y \to -\beta_z y \\ z \to z + \alpha_z d_z / 2 \end{cases}$$

where parameters $\alpha_x$, $\alpha_z$, are within interval [0; 1] and corresponding to the offsets in x and z directions respectively, parameters $d_x$, $d_z$, are periodicities of each element in x and z directions respectively, parameters $\beta_x$, $\beta_z$ are positive real numbers and corresponding to scaling factors in the mirroring transformation.

8. The filter according to claim 6 wherein the location of each element on the second plate is defined according to a coordinate transformation defined by $$G \equiv \begin{cases} x \to x + \alpha_x d_x / 2 \\ y \to -\beta y \\ z \to z + \alpha_z d_z / 2 \end{cases}$$

where parameters $\alpha_x$, $\alpha_z$, are within interval [0; 1] and corresponding to the offsets in x and z directions respectively, parameters $d_x$, $d_z$, are periodicities of each element in x and z directions respectively and parameter $\beta$ is a positive real number and corresponding to a scaling factor in the mirroring transformation.

9. The filter according to claim 1, wherein the coordinate system is a cylindrical coordinate system for circular waveguides or coaxial waveguides with twist symmetry.

10. The filter according to claim 1, wherein each element is a 3-D structure with any shape.

11. The filter according to claim 1, wherein numbers of elements along transversal and longitudinal directions are adjusted independently to fit in the cavity of the filter.

12. The filter according to claim 1, wherein size and/or shape of the elements are varied along a given direction.

13. The filter according to claim 1, wherein periodicities of the elements along transversal and longitudinal directions are different.

14. The filter according to claim 1, wherein periodicities of the elements along transversal and longitudinal directions are varied along a given direction.

15. The filter according to claim 1, wherein heights of the elements are adjusted along a longitudinal direction to match an input and output impedance of the filter.

16. The filter according to claim 1, wherein numbers of elements along transversal and longitudinal directions are different.

17. A method for designing a filter for filtering an electromagnetic wave, the method comprising:

choosing an element with regarding to geometry;

choosing size of a cavity with a first plate and a second plate, the first and second plates are in parallel and opposite to each other;

choosing a number of elements distributed on the side of the first plate facing the cavity;

defining locations of each element on the first plate by a coordinate system;

choosing a number of elements distributed on the side of the second plate facing the cavity;

defining locations of the elements on the second plate according to the locations of the elements on the first plate such that each element is distributed on the second plate with an offset with respect to a corresponding element on the first plate, wherein the elements are any of holes or recesses, and wherein the filter comprises electromagnetic band gap, EBG, surfaces on sides of the first and second plates to constrain the electromagnetic wave to propagate along a direction of the cavity from one end to the other, and as the electromagnetic wave is traversing about the elements in the cavity, specific wavelengths are filtered;

analyzing a unit cell comprising a subset of the chosen elements;

assessing performance of the unit cell;

modifying elements until improve matching;

assessing performance of the filter; and adjusting the size of a cavity, the number of unit cells until the performance of designed filter fulfils specifications of the filter.

* * * * *